US012616855B2

(12) United States Patent
Tedesco

(10) Patent No.: US 12,616,855 B2
(45) Date of Patent: May 5, 2026

(54) DEVICE FOR PERSONAL PROTECTION AND INSULATION AGAINST POLLUTANTS AND MICROORGANISMS AND FILTERING GROUP FOR DEVICES FOR PROTECTION AND INSULATION

(71) Applicant: AUTOMACUBE S.R.L., Palermo (IT)

(72) Inventor: Santi Tedesco, Palermo (IT)

(73) Assignee: AUTOMACUBE S.R.L., Palermo (IT)

( * ) Notice: Subject to any disclaimer, the term of this patent is extended or adjusted under 35 U.S.C. 154(b) by 747 days.

(21) Appl. No.: 17/914,343

(22) PCT Filed: Mar. 26, 2021

(86) PCT No.: PCT/IB2021/052537
§ 371 (c)(1),
(2) Date: Sep. 25, 2022

(87) PCT Pub. No.: WO2021/191867
PCT Pub. Date: Sep. 30, 2021

(65) Prior Publication Data
US 2023/0074725 A1       Mar. 9, 2023

(30) Foreign Application Priority Data

Mar. 27, 2020    (IT) ......................... 102020000006529
May 12, 2020    (IT) ......................... 102020000010639

(51) Int. Cl.
*A62B 7/10*         (2006.01)
*A62B 9/02*         (2006.01)
(Continued)

(52) U.S. Cl.
CPC ................... *A62B 7/10* (2013.01); *A62B 9/02* (2013.01); *A62B 18/006* (2013.01); *A62B 18/04* (2013.01);
(Continued)

(58) Field of Classification Search
CPC ............ A41D 13/1153; A41D 13/0025; A41D 13/1218; A41D 13/1184; A41D 13/11;
(Continued)

(56) References Cited

U.S. PATENT DOCUMENTS 2,826,758 A * 3/1958 Kahn ................. A41D 13/0025
                                                                2/81
3,413,972 A * 12/1968 Depping .............. A62B 18/045
                                                                128/201.23
(Continued)

*Primary Examiner* — Brandy S Lee
*Assistant Examiner* — Sara K Toich
(74) *Attorney, Agent, or Firm* — Rivka Friedman

(57)         ABSTRACT

A device for individual protection and isolation against pollutants and microorganisms comprises a protection element (1) of the face and a filtering group (2) of the air inhaled and/or exhaled by the user. The protection element (1) has at least one mouth for the passage of air provided with a one-way check valve (7) suitable to selectively allow the entry and the exit of air from said protection element (1), said filtering group (2) comprising a filter body (4) housing a filter (15) for purifying the air and in fluidic connection with the inside of said protection element (1), said filter body (4) having a first opening for drawing air from the outside and/or the expulsion of air towards the outside and a second opening for the delivery of the air into and/or the withdrawal of air from said protection element (1).

15 Claims, 9 Drawing Sheets

(51) Int. Cl.
    *A62B 18/00*      (2006.01)
    *A62B 18/04*      (2006.01)
    *A62B 18/08*      (2006.01)
    *A62B 18/10*      (2006.01)
    *A62B 23/02*      (2006.01)
    *B01D 46/00*      (2022.01)

(52) U.S. Cl.
    CPC ............ *A62B 18/084* (2013.01); *A62B 18/10*
        (2013.01); *A62B 23/02* (2013.01); *B01D*
      *46/0002* (2013.01); *B01D 46/0028* (2013.01);
                      *B01D 2279/40* (2013.01)

(58) Field of Classification Search
    CPC .. A41D 2200/20; A62B 17/04; A62B 17/006;
           A62B 9/02; A62B 18/10; A62B 18/086;
           A62B 18/006; A62B 18/04; A62B 18/02;
           A62B 18/045; A62B 7/10; A62B 7/00;
           A62B 23/02; A42B 3/286; A61L 2209/14;
                  A61L 9/20; A61M 16/0627
    See application file for complete search history.

(56) References Cited

U.S. PATENT DOCUMENTS

| | | | |
|---|---|---|---|
| 3,589,870 A * | 6/1971 | Rankin .............. | B01D 53/0415 |
| | | | 55/482 |
| 4,815,458 A * | 3/1989 | Sing ........................ | A62B 7/00 |
| | | | 128/205.12 |
| 5,042,474 A * | 8/1991 | Williamson ....... | A41D 13/1184 |
| | | | 55/DIG. 35 |
| 6,983,745 B2 * | 1/2006 | Tang .................. | A41D 13/0025 |
| | | | 128/201.25 |
| 2006/0277668 A1 * | 12/2006 | Plut ..................... | A62B 17/001 |
| | | | 2/457 |
| 2010/0083958 A1 * | 4/2010 | Lloyd .................... | B29C 45/00 |
| | | | 128/201.28 |
| 2014/0331999 A1 * | 11/2014 | Rossi ................ | A61M 16/0627 |
| | | | 128/202.27 |
| 2020/0061399 A1 * | 2/2020 | Wade ................... | A62B 18/025 |
| 2020/0281286 A1 * | 9/2020 | Cuoco ................... | A42B 1/046 |

* cited by examiner

200

1

33

DEVICE FOR PERSONAL PROTECTION AND INSULATION AGAINST POLLUTANTS AND MICROORGANISMS AND FILTERING GROUP FOR DEVICES FOR PROTECTION AND INSULATION

TECHNICAL FIELD

The present invention is generally applicable to the field of personal protective equipment and particularly relates to a device for personal protection and isolation suitable for being worn by a user to protect himself from pollutants and microorganisms, in particular pathogens such as bacteria and viruses, or to isolate an infected person from diseases that could be spread through the airways, protecting the environment and surrounding people.

The invention also relates to a filtering group designed to be applied to masks or similar accessories that can be worn by a user and designed to cover the whole face to obtain the above protection and isolation device.

STATE OF THE ART

As known, current medical devices for personal protection of wearable type, such as masks and the like, for protection against dust, pollutants or pathogenic microorganisms (in particular viruses and bacteria), supplied to health workers, personnel operating in the industrial sector or even ordinary citizens, in particular sick or otherwise infected subjects, are designed to cover only a limited part of the face, usually the mouth and nose, i.e. the airways, but do not allow full face protection.

As a consequence, these devices could not be entirely effective, both because it is not uncommon for the person wearing one of these devices to not always correctly cover all parts of the face and also due to the fact that it is proven that other parts of the face, in particular the eyes, may be a way for pathogens to enter the body. Moreover, known masks worn by the person who wants to protect themselves, currently do not guarantee total and effective protection of the entire head or face area through airtight filters.

Another known problem, connected with existing devices, is the position of the filter near the most sensitive areas. This circumstance, during the manipulation of the mask, both in the dressing and undressing steps, may lead to contamination of the user.

Furthermore, the type of filters of current filtering devices do not allow them to be reused, after any sterilization.

DE102018100473 tries to overcome at least partially these drawbacks by providing a personal protection device that associates with a common mask also a transparent protective helmet that covers the whole head and wherein the face mask is connected to a separate filtering element designed to be worn by the user in a position other than the head.

The connection between the mask and the filtering element is provided by a pipe for delivering the filtered air towards the mask and then towards the user's mouth and a tube for taking the air out of the user's mouth.

However, this solution is suitable for carrying out only a protective function for the user of the protection device and is not adequate for protecting the surrounding people if it is the user himself who is the infected person.

Where such masks are worn by infected people, to prevent propagation to the outside, since the hermetic seal is not guaranteed, there may even be contamination of the environment surrounding the person wearing it, with considerable health risks. The current alternative is the confinement of the subject in hospital environments in a negative pressure atmosphere, slightly lower than that of the surrounding environment, whose realization however requires enormous space, time and resources.

A further drawback of known personal protective equipment lies in the impossibility of keeping such devices worn and at the same time allowing the consuming of drinks or food.

Some solutions, such as US2018280758, have tried to overcome this limit by providing a connection for a straw on the front of the device that allows the user to take liquids from a glass without undressing the device.

However, it seems clear that this solution does not allow the intake of food and therefore is not suitable for allowing proper hydration and nutrition in safe conditions.

US2016332008 discloses a face mask provided with a completely removable front portion placed directly in front of the mouth.

In this way, the user wishing to take food or drink would have the possibility to remove only the front part without having to undress the entire protective device.

However, the configuration of the face mask is such that once the front is removed, the device ceases to have any protective function.

Still another limitation of the well-known personal protective equipment lies in their poor ergonomics and their inconvenience, not allowing the execution of normal gestures and activities when they are worn.

In particular, none of the known devices allows the possibility of carrying out manipulations on the inside of the casings, acting from the outside, so as to allow to carry out basic physiological functions, such as scratching, cleaning the face or repositioning any glasses worn by the user, without first having to remove the device. For example, GB2247175 and KR101136999 disclose personal protective devices equipped with a helmet designed to fully cover the user's head and which is provided at the base with a flexible membrane that wraps around the user's neck to ensure hermetic sealing.

However, the membrane does not allow the insertion of a hand inside the helmet and is also designed in such a way that after the undressing thereof, there is a high risk that its outside will come into contact with the user's mouth, with risk of transmission of any pathogenic elements or impurities that may have accumulated thereon.

SCOPE OF THE INVENTION

The object of the present invention is to overcome the above drawbacks by providing a device for personal protection and isolation against polluting substances and microorganisms which is highly safe and effective.

A particular object is to provide a personal protection and isolation device against pollutants and microorganisms which allows the integral protection of the face.

Still another object is to provide a personal protection and isolation device against polluting substances and microorganisms which also allows the reuse of the filters in situations in which they are not available, such as in the case of emergency situations such as epidemics and pandemics.

Still another object is to provide a personal protection and isolation device against pollutants and microorganisms suitable to be worn both from healthy individuals and infected individuals, always guaranteeing maximum safety both for the person wearing the device and for the people nearby.

Still another object of the present invention is to provide a filtering group that can be applied to a pre-existing protection device, even if not of a medical nature, such as a common mask for underwater or snorkeling use, to transform it into the device according to the present invention.

Still another object of the present invention is to provide a personal protection device which guarantees overall better ergonomics and allows comfortable use of the device even for prolonged periods.

Another particular object is to allow the possibility of eating and drinking comfortably even without removing the worn device, and therefore allowing to access activities and services potentially prohibited by hygiene regulations.

A particular object is to allow, without removing the device, to carry out manipulations from the outside of the device, on the head of the person using it, such as, by way of not exclusive example, cleansing or scratching the face or repositioning any glasses worn by the user.

Still another particular object is to allow the monitoring of chemical-physical parameters, such as, by way of a not exclusive example, thermo-hygrometric, pressure, chemical parameters, inside the protection device, adjusting them in real time so as to ensure optimal conditions, detecting any anomalies, allowing remote control via wireless connection.

Another particular object is to transfer the weight of the device directly to the user's trunk and allow free rotation of the neck.

These objects, as well as others that will become more apparent hereinafter, are achieved by a device for personal protection and isolation against pollutants and microorganisms in accordance with claim 1, to which reference should be made for greater conciseness of the exposition.

Thanks to this combination of features, the device may be used in two ways, i.e. in a first protection mode for the user, wherein the incoming air is filtered to prevent the user from inhaling pollutants or pathogens, and in a second isolation mode if the user is an infected subject and wherein the filtering will be carried out for the outgoing air while it will be avoided that infected air may escape from the mouth provided on the protection element.

According to a further aspect of the invention, a filtering group is provided which will be adapted to be applied to pre-existing protection elements, such as diving or snorkeling masks or also other devices for medical use such as masks already on the market, provided that they are suitably configured, for turn them into a protection and insulation device according to the present invention. Advantageous embodiments of the invention are obtained in accordance with the dependent claims.

BRIEF DISCLOSURE OF THE DRAWINGS

Further features and advantages of the object of the invention will become more apparent in the light of the detailed description of preferred but not exclusive embodiments of the device for personal protection and insulation according to the invention, illustrated by way of non-limiting example with the aid of the attached drawing tables wherein.

Figure 4:
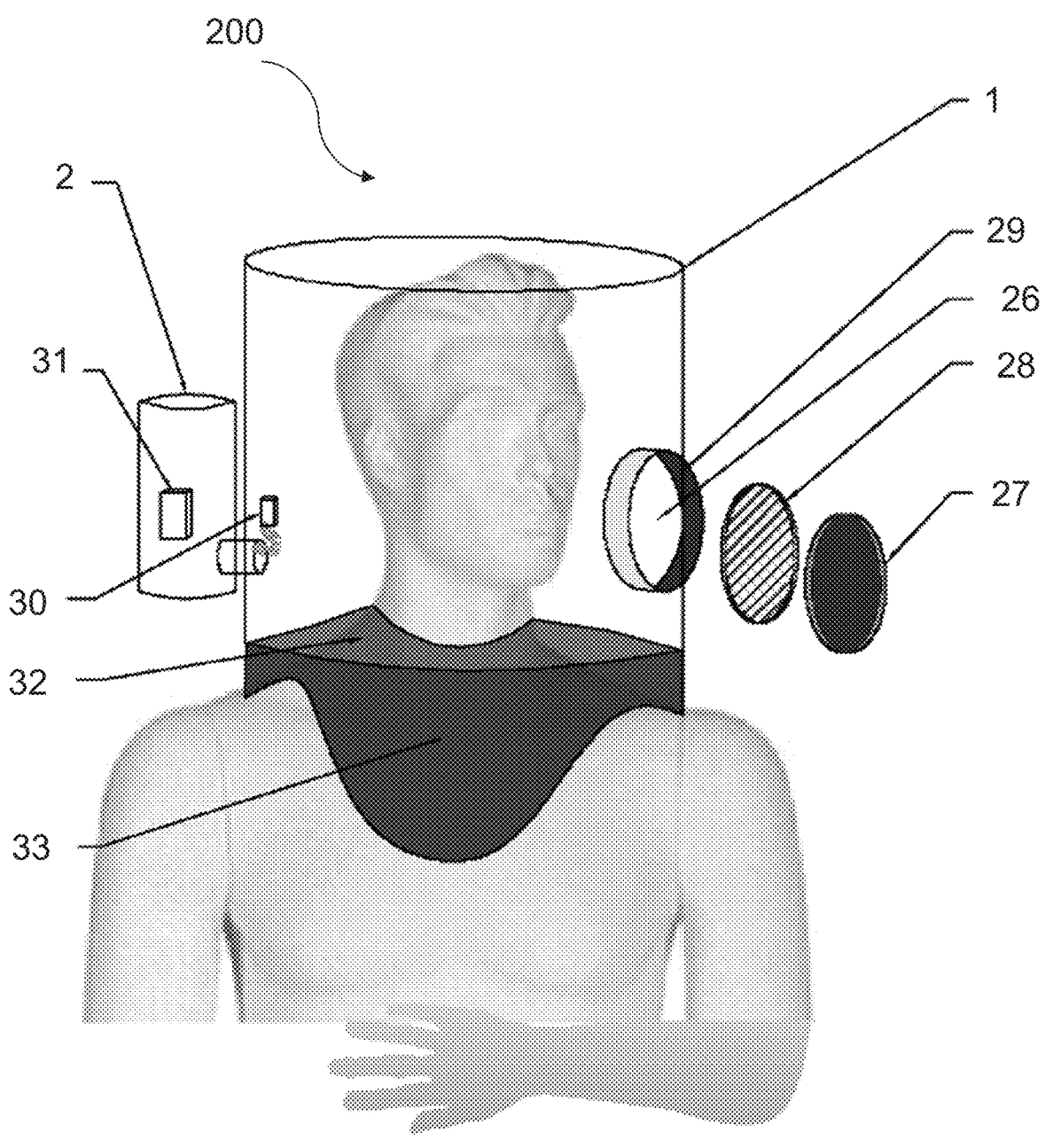
FIG. 4 is a schematic view of the protection device in a second preferred embodiment.

FIGS. from 5 to 9 are some variants of the device of FIG. 4 which comprise only some elements of this device.

BEST MODES OF CARRYING OUT THE INVENTION

With reference to the attached figures, some preferred but not exclusive embodiments of the device according to the invention are shown, designed to be worn by a user in order to avoid the inhalation of particles of ultrafine pollutants, such as droplets, particulates, dust, and/or pathogens such as bacteria, *mycoplasma*, viruses, and microorganisms in general.

The device will also be suitable to be used by people infected with bacteria or viruses in order to avoid contamination of the surrounding environment and of nearby people with such pathogenic microorganisms.

Figure 1:
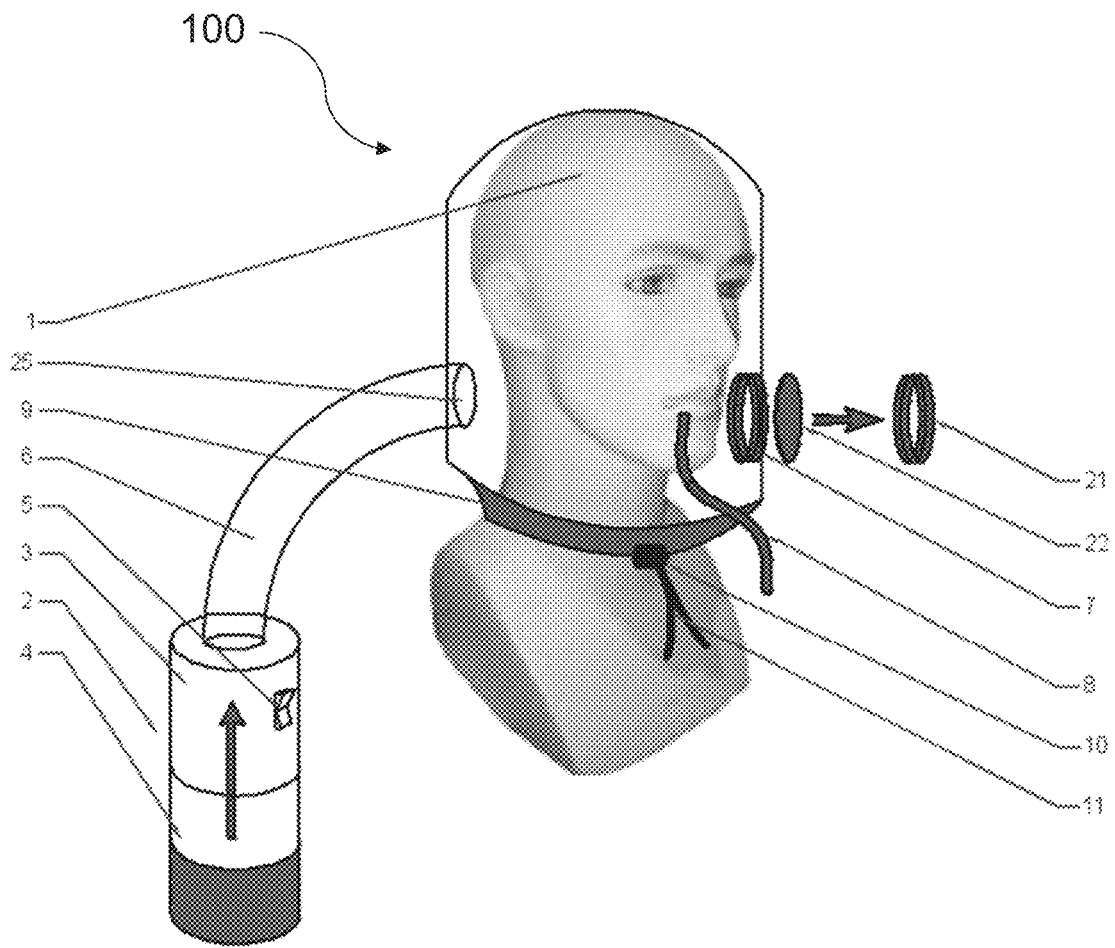
FIG. 1 is a schematic view of a device according to the invention in a first preferred embodiment.

FIG. 1 shows a first embodiment wherein the device, indicated globally with 100, comprises a protection element 1 of the head adapted to be worn by the user to almost completely cover the head and a filtering group 2 of the air inhaled and/or exhaled by the user.

In this preferred but not exclusive embodiment, the protection element 1 consists of a helmet, made of rigid or relatively yielding material, which will contain the entire head of the user and is provided at its lower opening, necessary for the insertion of the head, an elastic band 9 with hermetic closure adapted to be arranged and tightened around the neck of the user, in order to avoid exchange of air with the outside through this area.

The elastic band 9 will be suitably provided with adjustable closure by means of tensioners 11 provided with a locking element 10, so as to always guarantee the total tightness of the protection element 1.

Conveniently, the protection element 1 will be transparent at least at the eyes, or at least on the whole part that covers the face, to allow unobstructed vision.

However, it is understood that the protective element may also be designed to only partially cover the user's head, as long as it covers and insulates the entire face from the outside.

The protection element 1 is frontally provided with a mouth for the passage of air which will be arranged in a position such as to be in front of the user's mouth.

The air passage mouth is provided with a one-way check valve 7 designed to selectively allow the entry and exit of air from the protection element 1.

Advantageously, the one-way valve 7 will be of the reversible type to vary the air outlet direction with respect to the front passage mouth, so as to allow only the entry of air inhaled by the user or only the exit of exhaled air, depending on needs.

Preferably, the passage mouth may be provided with an anti-emission filter 22 and possibly also with a ring nut 21 for connection to forced ventilation and/or oxygenation means.

In addition, the protection element 1 may be provided with a further opening different from the front mouth for the insertion of a cannula 8 for feeding the user, which cannula 8 will be provided with a check valve and a closing cap.

Figure 2:
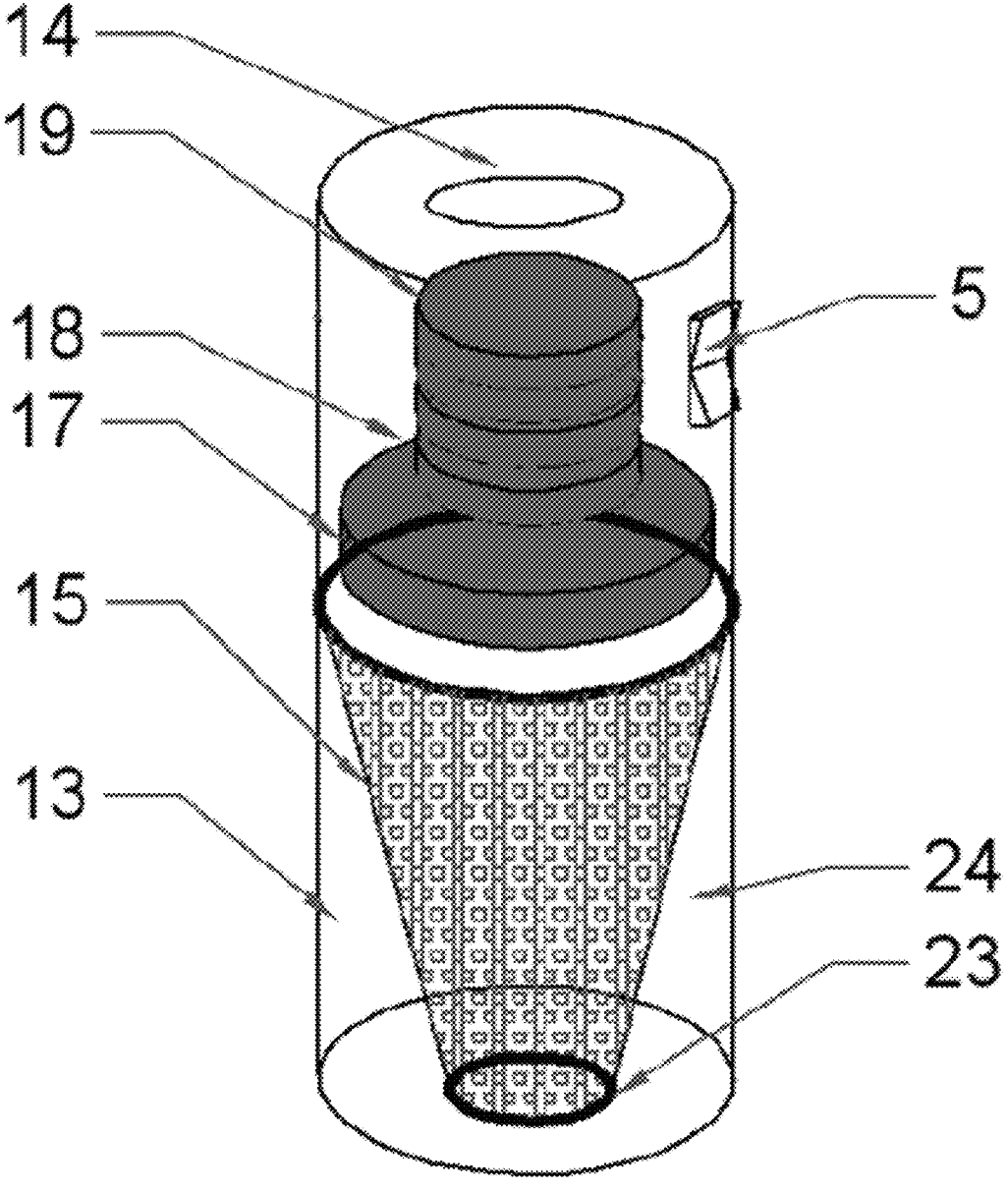
FIG. 2 is a schematic view of the filtering group that can be associated with the device of FIG. 1, wherein the inside of the filtering group is made visible.

The filtering group 2, shown in greater detail in FIG. 2, in turn comprises a filter body 4 housing inside it a filter 15 for purifying the air entering or leaving the filtering group 2 and in fluidic connection with the inside of the protection element 1 through an access 25 made on the same protection element 1.

Preferably, but not necessarily, this access 25 will be spaced apart from the front air passage mouth and even more preferably arranged on the opposite side with respect thereto, that is, behind the protection element 1.

In this way, it will be possible to have the additional advantage of keeping the filter 15 as far away as possible from the sensitive parts of the face, i.e. eyes, mouth and nose, both in the dressing and undressing steps of the device, ensuring further safety. The filter body 4 comprises a first opening for the intake of air from the outside and/or the expulsion of air towards the outside and a second opening for the delivery of the air into and/or the withdrawal of air from the protection element, depending on the methods of use which will be explained more clearly below.

The filter body 4 may be mounted directly on the protection element 1 or, as in the attached figures, provided with a connecting pipe 6 which allows it to be spaced apart and which can be selectively connected to one of the two openings, which in turn are suitably provided with fixing bushings 14, 23, in addition to the access 25 provided in the protection element 1.

In particular, the filter body 4 may be connected to the protection element 1, directly or through the connecting pipe 6, according to two connection directions in which the positions of the first opening and the second opening are reversed to each other to be selectively connected to the rear access 25 of the protection element 1.

In the illustrated embodiment, the filter body 4 is mounted in the condition in which you want the air to enter the protection element 1 and then reach the user through the filtering group 2.

This condition will correspond to the one-way valve 7 in a position that allows the expulsion of air.

This condition represents use in user protection mode, as the inhaled air will be filtered and at the same time it will be prevented that contaminated and unfiltered air, that is not adequately filtered, may be inhaled.

In this operating mode, the inside of the protection element 1 may remain under positive pressure, ensuring further safety against the penetration of the above particles or microorganisms.

In a second mode of use, the filter body 4 can be mounted upside down, i.e. with the first opening connected to the connecting pipe 6, so that the air escapes through the filtering group 2.

This condition will correspond to the one-way valve 7 in a position that allows the entry of air.

This condition represents the use in the user's isolation mode, as the exhaled air will be filtered, preventing the pathogens from which the user is infected from contaminating the outside and nearby people.

At the same time, the user may breathe through the one-way valve 7, whose possible filter 22 will be adapted to remove any external particles.

In this second operating mode, the inside of the protection element 1 may remain at negative pressure, ensuring further safety against the escape of the aforementioned ultrafine particles and microorganisms.

Furthermore, this operating mode will be useful for obtaining the confinement of a subject, possibly infected, and the isolation thereof in a negative atmosphere, avoiding the spread of the infection to individuals close to him.

In this way, it will be possible to have an almost total confinement of the infected subject, without resorting to the onerous structures of the negative pressure chambers, with enormous savings in terms of costs, time, space, and possibly allowing family contacts.

The transition from protection mode to isolation mode may be easily implemented by reversing the direction of the one-way valve 7 and simultaneously the direction of the air flow in the filtering group 2.

Possibly, the filter body 4 may house means for the forced ventilation designed to promote the air flow inside the filter body 4 and of the possible connection pipe 6 in two opposite directions that can be selected alternatively between them, also allowing less effort of the respiratory act in both modalities.

To this end, the means for the forced ventilation will comprise an electric motor 18, for example of the single-step type, housed in a motor body 3 integral with the filter body 4 and powered by batteries 19 or other power means, also of the rechargeable and/or renewable type or external power sources.

The motor 18 will be associated with a fan 17 which will produce the flow of air towards the inside of the protection element 1 or out of it, according to the mounting direction of the filtering group 2.

The latter may also house a control board provided with sensor means designed to detect the pressure inside the filtering group 2 and/or the protection element 1 and to detect any anomalies during operation.

The filtering group 2 may also be provided with an external control 5 for the activation of the means for forced ventilation and/or with a display for the control of the parameters and possibly of the touch type in order to give commands to the control board and/or to the means for forced ventilation.

The filter 15 placed in the filter body 4 will preferably be a HEPA or ULPA filter, according to the required safety requirements, and may also be sterilizable and/or washable in order to be reused.

In this case, the filter may be removable from the compartment 13 in which it is inserted, to be replaced or sterilized.

Advantageously, the filter body 4 may also house a thermal or luminous sterilizer 24, such as a UVC or IR lamp, which will act on the filter 15 to sterilize it without having to remove it.

The protection element 1 may also be made of one or more washable and hot and/or cold sterilizable materials.

Figure 3:
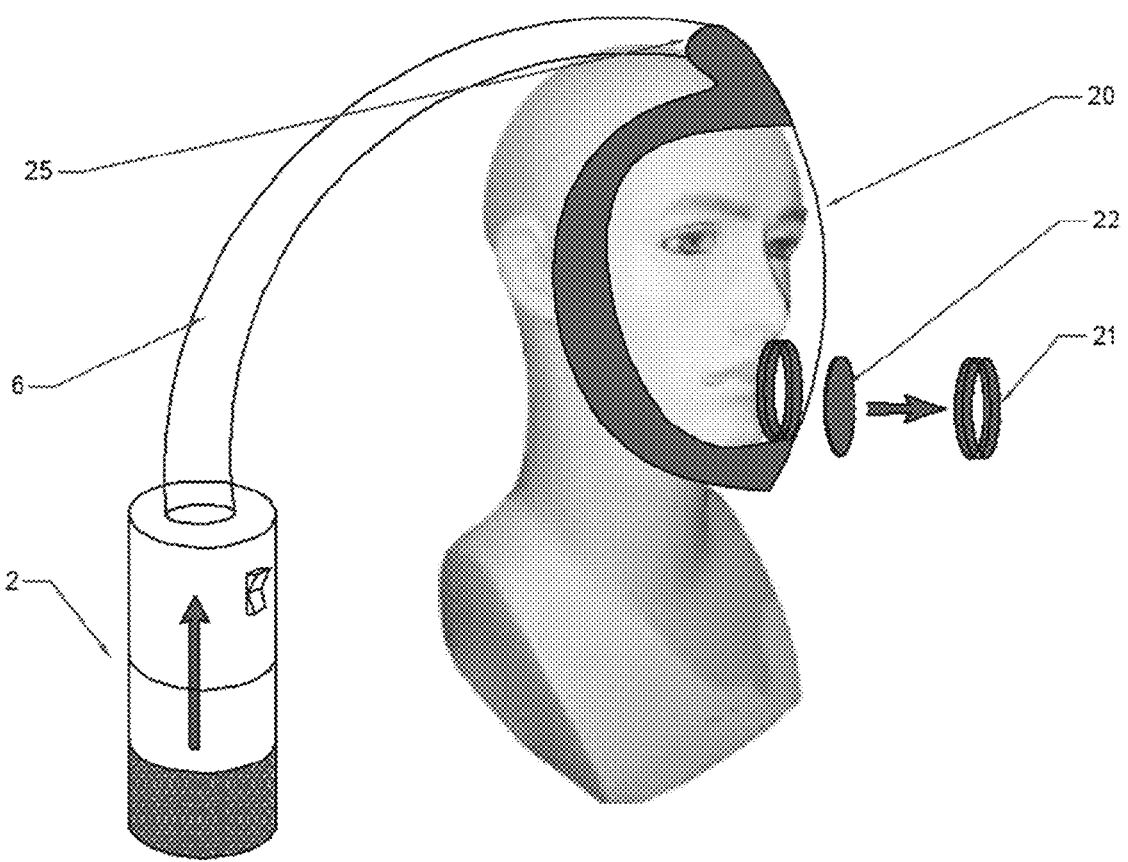
FIG. 3 is a schematic view of the group of FIG. 2 applied to a known type of diving or snorkeling mask.

FIG. 3 shows a second embodiment of the device according to the invention obtained by applying a filtering group 2 provided with a connection pipe as described above to a diving or snorkeling mask 20 of a known type and possibly available on the market and wherein the connecting pipe 6 is connected directly to the air inlet pipe or snorkel of the mask 20.

The mask 20 may be further modified to insert the one-way check valve 7 at the front mouth, to which the above filter 22 and possibly the ring nut 21 for connection to the means for forced ventilation and/or oxygenation means may also be applied.

This solution will have the advantage of being cheaper and easier to implement.

FIG. 4 shows a further embodiment of the device, indicated globally with 200, wherein the protection element 1, in addition to being associated with a filtering group 2 in a manner at least functionally equivalent to that described above, is provided with further accessories and functionality.

A first additional function is represented by the presence, at the front part of the protection element 1 designed to be placed at the user's mouth, of an opening 26 through which, by removing a suitable cap 27, which can advantageously also house an additional removable filter 28, it will be possible to easily introduce solids and/or liquids, such as for example food and drinks.

According to a variant, a device 29 may be provided with opening 26 and cap 27 and applicable to existing protection devices to achieve access for solids and/or liquids.

In order to guarantee the maintenance of the safety conditions for the user, inside the protection element 1 there may be sensor means 30 adapted to detect one or more environmental parameters, such as pressure, temperature, humidity, and connected to an electronic control board 31, for example arranged in the filtering group 2 or in any case associated therewith, which will operate to keep these parameters always at pre-set security levels, possibly detecting anomalies and being adapted to communicate with remote control systems by means of wireless communication systems.

In this way, according to a particularly advantageous embodiment, it will be possible to keep the internal space of the protection element 1 always in slight overpressure, if the device operates in the user's protection mode, or in slight depression in case of operation in the isolation mode, by the means for forced ventilation placed in the filtering group 2 or externally thereto and controlled by the electronic board 31.

This feature will guarantee the protection of the user or of the persons nearby, according to the operating modes, even when the user removes the cap 27 to take food and/or drinks and/or to introduce any other object.

As matter of fact, in the protection mode the generated overpressure will prevent the entry of air from the outside and therefore the entry of possible impurities or sources of contagion, while in the isolation mode the depression will prevent the potentially infected droplet emitted by the user from spreading in the surrounding outside.

A further accessory element will then consist of a deformable sealing membrane 32 placed at the base of the protection element 1 to define a neck-tightening band which allows access to the head inside the protection element 1 and hermetic closure around the neck.

In this preferred but not exclusive embodiment, the membrane 32 will be sufficiently wide and deformable to allow, for example, the insertion of a hand inside the protection element 1 but always remaining on the outside of the membrane 32 so as to do not cause contamination of the internal space.

In this way, it will be possible to carry out manipulations in the internal space, such as, by way of a not exclusive example, cleansing or scratching the user's face, repositioning any glasses.

In this embodiment, the deformable membrane 32 will be suitably provided with an adjustable closure by means of tensioners and with a locking element, to guarantee sealing.

Even more preferably, the deformable membrane 32 will be designed to be turned up on the external part of the protection element 1, in such a way as to expose its internal part to the outside and avoid, during undressing, potential contamination.

According to yet another particularly advantageous aspect, the protection element 1 may have an ergonomically shaped support base 33, for example in the shape of a saddle with a pair of recesses and made of rigid material or of relatively yielding material which will conform to the physiognomy of the user, allowing the weight of the device 200 to be unloaded directly on the shoulders and trunk of the user and allowing the free rotation of the head inside the protection element 1, improving the ergonomics, tolerability and visual efficiency of the device 200 as a whole.

According to a first variant, the device 200 of FIG. 4 may be provided with a reversible filtering group 2 and/or a one-way check valve 7 which is also reversible in an equivalent manner to what is described for the configuration of FIG. 1.

According to still further variants, however, the filtering group 2 and/or the valve 7 may be absent and/or non-reversible, in the sense that they will operate with respect to a single direction of the air flow.

FIGS. 5 to 9 illustrate further variants provided with a single type of accessories present in the embodiment of FIG. 4.

Figure 5:
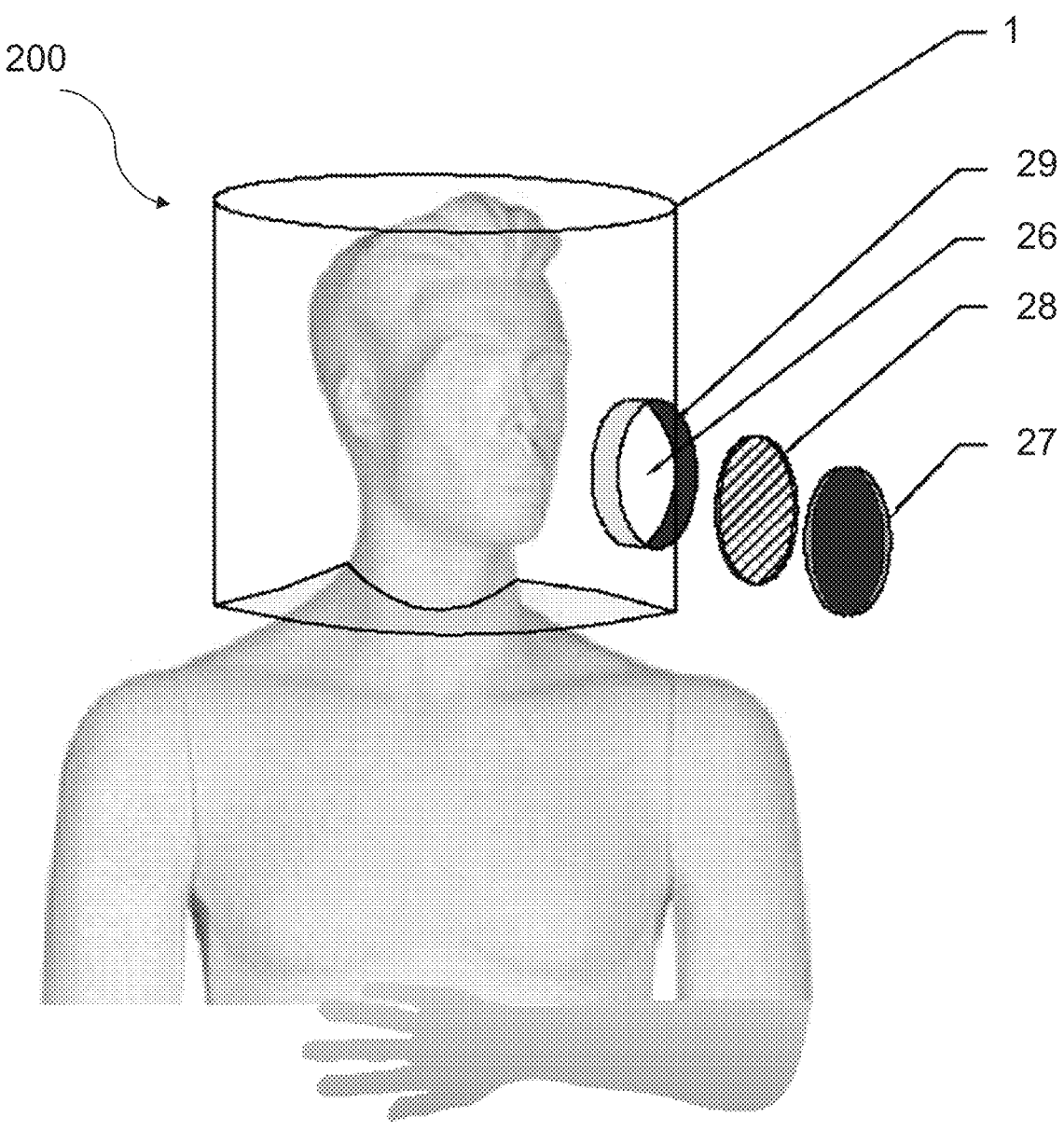

In particular, FIG. 5 shows a device 200 provided with only the opening 26 with cap 27 and optional filter 28.

Figure 6:
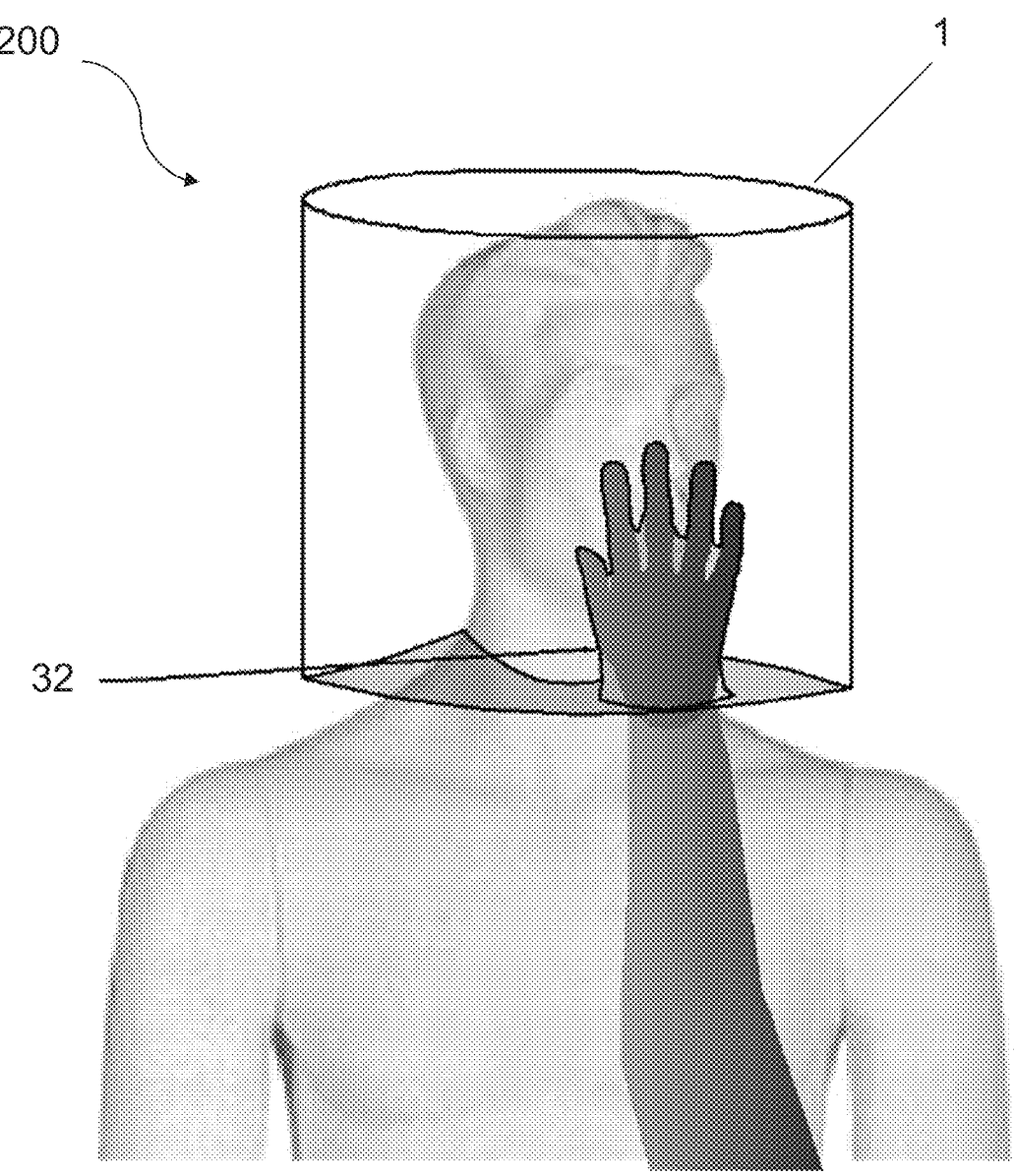

FIG. 6 shows a device 200 provided with only the deformable membrane 32 placed around the neck.

Figure 7:
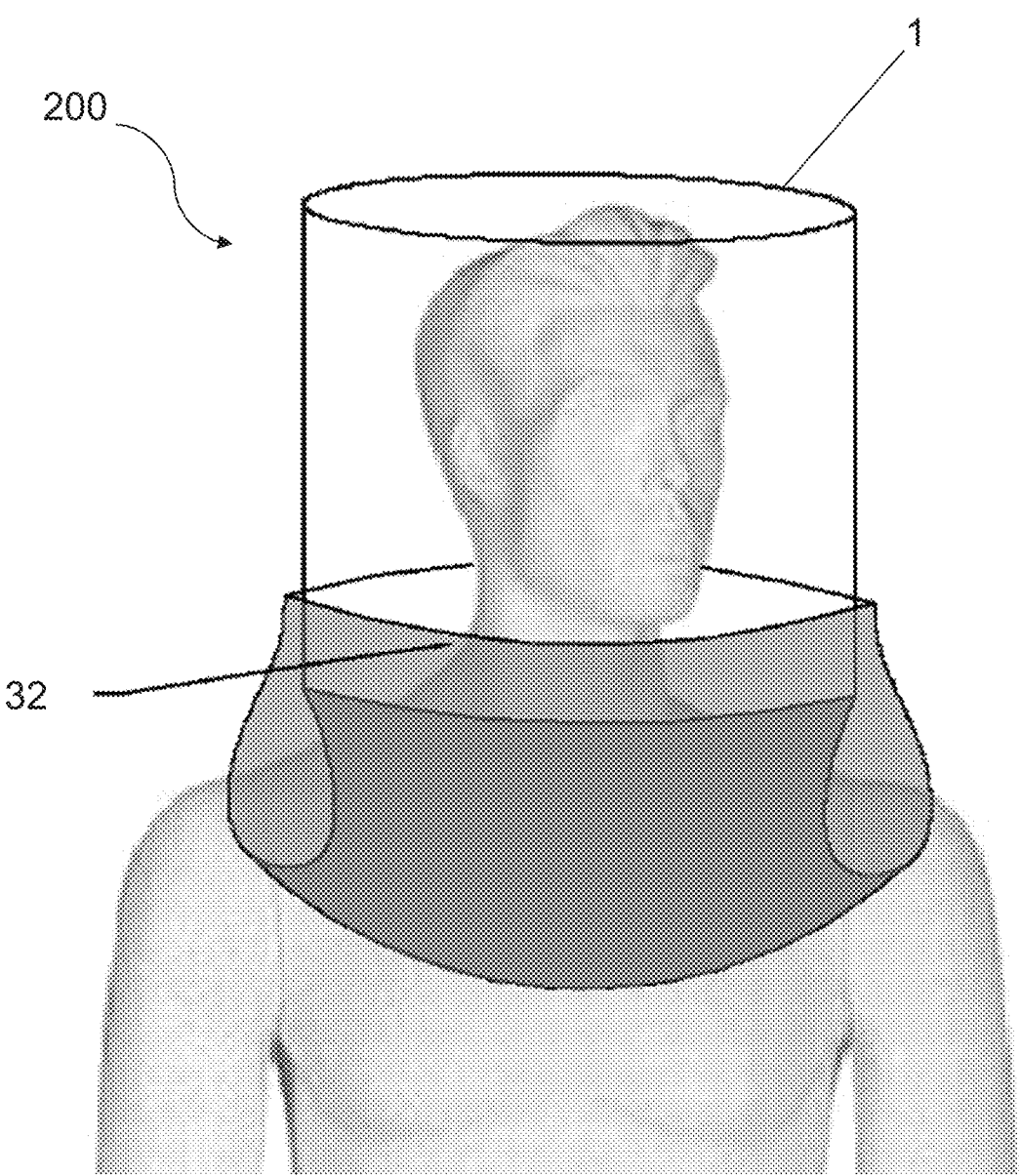

FIG. 7 shows device 200 provided with only the deformable and foldable membrane 32.

Figure 8:
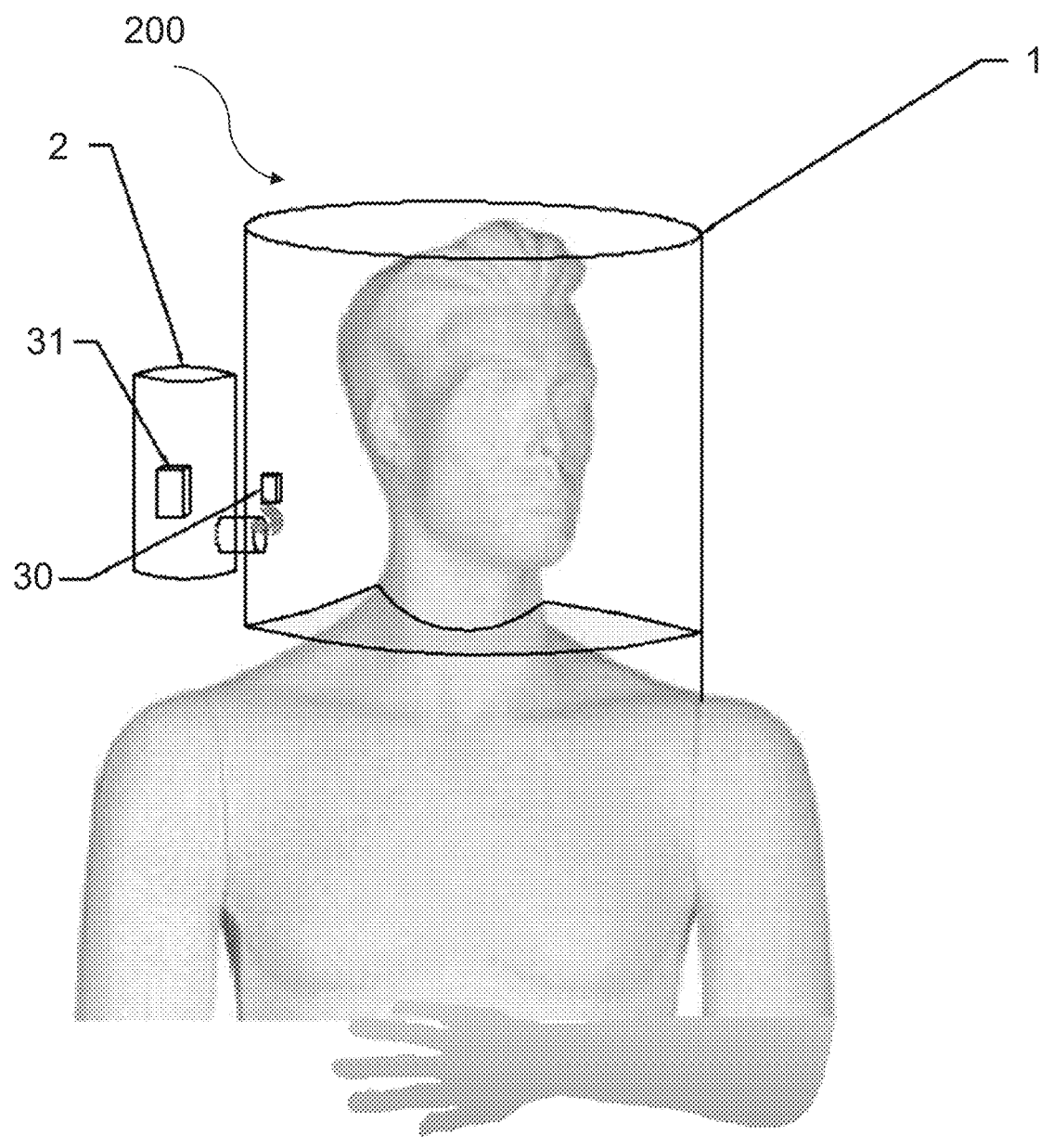

FIG. 8 shows a device 200 provided with only the filtering group 2 with the air treatment means, including the electronic board 31, and the sensors 30.

Figure 9:
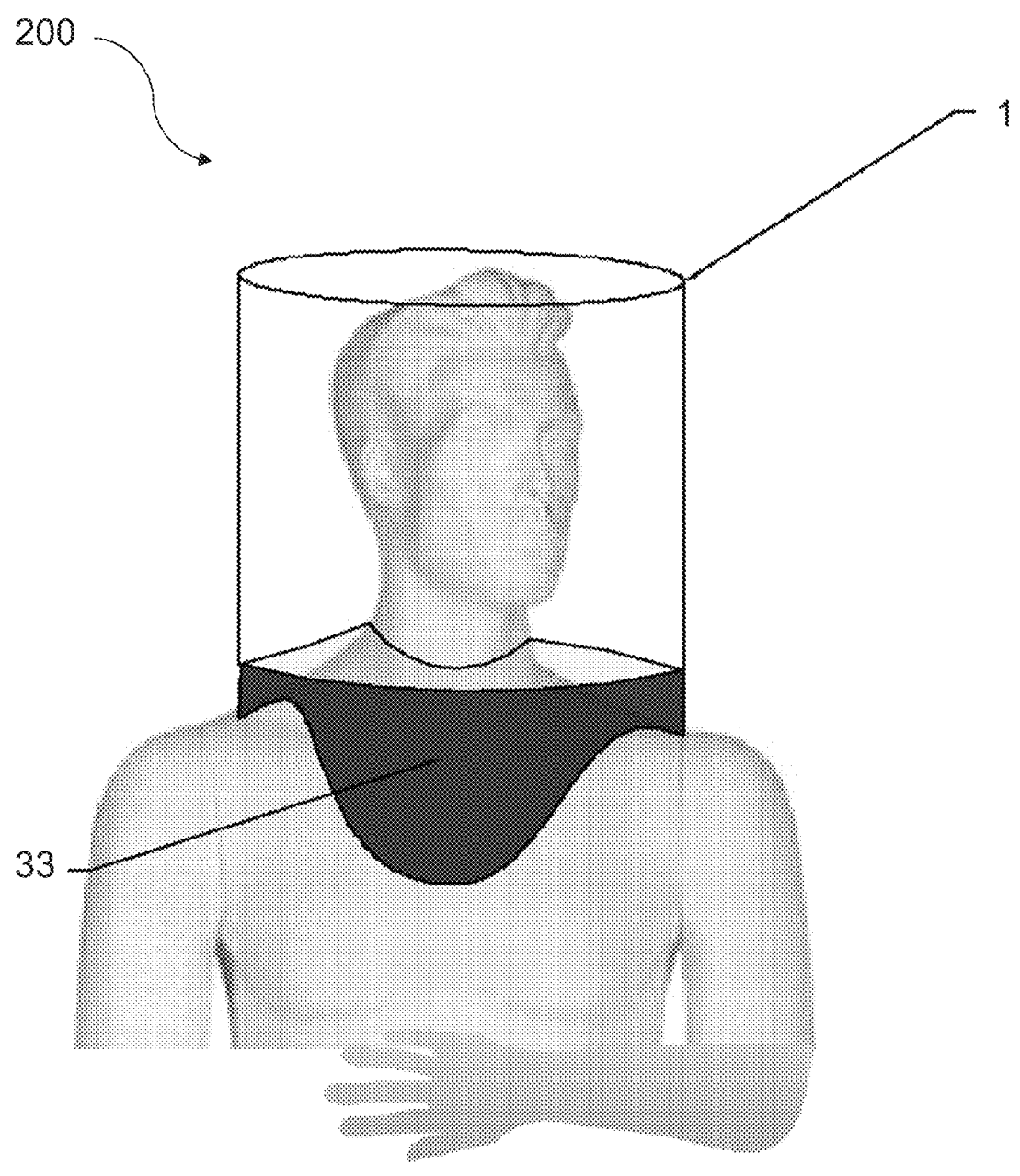

Finally, FIG. 9 shows a device 200 provided with only the ergonomic support base 33.

However, it is understood that it will be possible to configure the protection device according to further embodiments different in the number and type of means and accessories selected from those described above according to multiple combinations of those available.

From above, it is apparent that the device according to the present invention achieves the intended objects.

The invention claimed is:

1. A device for individual protection and isolation against pollutants and microorganisms, comprising:
 a protection element (1) of the face designed to be worn by the user;
 a filtering group (2) of the air inhaled and/or exhaled by the user;
 wherein said protection element (1) is adapted to cover at least the whole face of the user and has at least one mouth for the passage of air provided with a one-way check valve (7), said filtering group (2) comprising a filter body (4) housing a filter (15) for purifying the entering or leaving air and in fluidic connection with the inside of said protection element (1) by means of an access (25) made in said protection element (1) distinct from said mouth, said filter body (4) having a first opening for drawing air from the outside and/or the expulsion of air towards the outside and a second opening for the delivery of the air into and/or the withdrawal of air from said protection element (1);
 wherein said one-way check valve (7) is of the reversible type to vary the direction of air outlet with respect to said passage mouth and to selectively allow the entry or the exit of air from said protection element (1) and said filter body (4) is adapted to be connected to said protection element (1) according to two connection directions wherein the positions of said first and second opening are inverted to each other to be selectively connected to said access (25) of said protection element (1).

2. The device as claimed in claim 1, characterized in that said one-way check valve (7) is provided with a ring nut (21) for connection to means for forced ventilation and/or oxygenation means.

3. The device as claimed in claim 2, characterized in that said filtering group (2) houses means for forced ventilation suitable for promoting the flow of air in said filter body (4) according to two opposite directions which can be selected in an alternative manner therebetween.

4. The device as claimed in claim 3, characterized in that said means for forced ventilation comprise an electric motor (18) powered by batteries (19) or other power means, also of the rechargeable and/or renewable type.

5. The device as claimed in claim 4, characterized in that said filtering group (2) houses a control board (31) connected to sensor means (30) suitable for detecting the pressure inside said filter body (4) and/or of said protection element (1) and to detect any anomalies during operation.

6. The device as claimed in claim 5, characterized in that said filtering group (2) comprises a connecting pipe (6) of said filter body (4) with said access (25) of said protection element (1).

7. The device as claimed in claim 6, characterized in that said filter (15) is selected from the group comprising HEPA and ULPA filters and is sterilizable and/or washable in order to be reused.

8. The device as claimed in claim 7, characterized in that said filtering group (2) houses an ultraviolet-C (UVC) or infrared (IR) sterilizer (24) for said filter (15).

9. The device as claimed in claim 1, characterized in that said protection element (1) is designed to contain the entire head of the user and is provided with an elastic band (9) with hermetic closure adapted to be arranged and tightened around the user's neck and a cannula (8) equipped with a check valve for feeding the user.

10. The device as claimed in claim 9, characterized in that said access (25) of said protection element (1) is arranged on the opposite side with respect to said air passage mouth.

11. The device as claimed in claim 10, characterized in that said protection element (1) comprises a front opening (26) sufficiently wide to allow the introduction of solid and/or liquid objects and provided with a removable closing cap (27) possibly provided with at least one filter (28).

12. The device as claimed in claim 11, characterized by comprising air treatment means designed to keep the air inside said protective element always in overpressure.

13. The device as claimed in claim 12, characterized in that said protection element (1) is provided at its lower opening for the insertion of the head, with a deformable sealing membrane (32) suitable for allowing the insertion of a hand inside said protection element (1).

14. The device as claimed in claim 13, characterized in that said deformable membrane (32) is designed to be turned up on the external part of said protective element (1), when removed from the user, in such a way as to expose its internal part to the outside.

15. The device as claimed in claim 14, characterized in that said protection element (1) has a support base (33) ergonomically shaped to conform to the physiognomy of the user.

* * * * *